United States Patent [19]

Brinson

[11] 3,962,995
[45] June 15, 1976

[54] APPARATUS FOR TRAINING CUTTING HORSES

[76] Inventor: Durwood S. Brinson, 2323 Brownlee Rd., Bossier City, La. 71010

[22] Filed: Mar. 18, 1975

[21] Appl. No.: 559,535

[52] U.S. Cl. .................................. 119/29; 46/123; 273/105.2
[51] Int. Cl.² .......................................... A01K 15/00
[58] Field of Search ..................... 119/29; 46/123; 273/105.2; 272/31 R

[56] References Cited
UNITED STATES PATENTS

| | | | |
|---|---|---|---|
| 3,303,821 | 2/1967 | Harris | 119/29 |
| 3,324,832 | 6/1967 | McCain | 119/29 |

Primary Examiner—Louis G. Mancene
Assistant Examiner—J. N. Eskovitz
Attorney, Agent, or Firm—Sherman & Shalloway

[57] ABSTRACT

In order to train cutting horses, an artificial calf is mounted to: (1) swivel about a vertical axis extending therethrough, (2) advance and retreat, and (3) sweep back and forth in a horizontal plane. These manuevers are performed in response to signals from an operator who manipulates a pneumatic control mechanism. In the preferred embodiment, the calf is mounted to swivel on a platform which is attached to an extension projecting from a boom. The extension is selectively telescoped in and out of the boom, and the boom is selectively swept back and forth about a mounting pivot.

8 Claims, 3 Drawing Figures

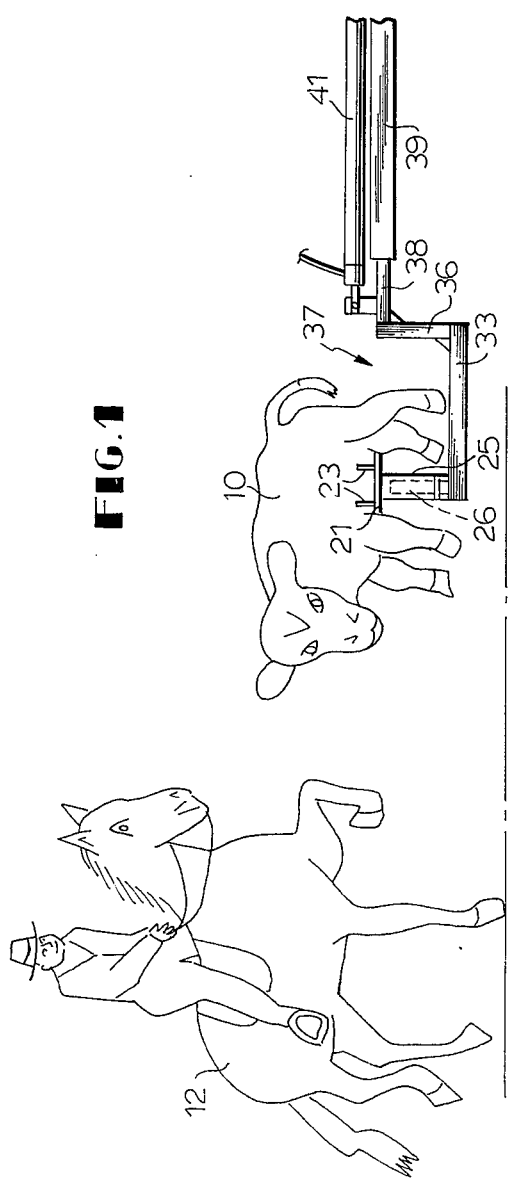
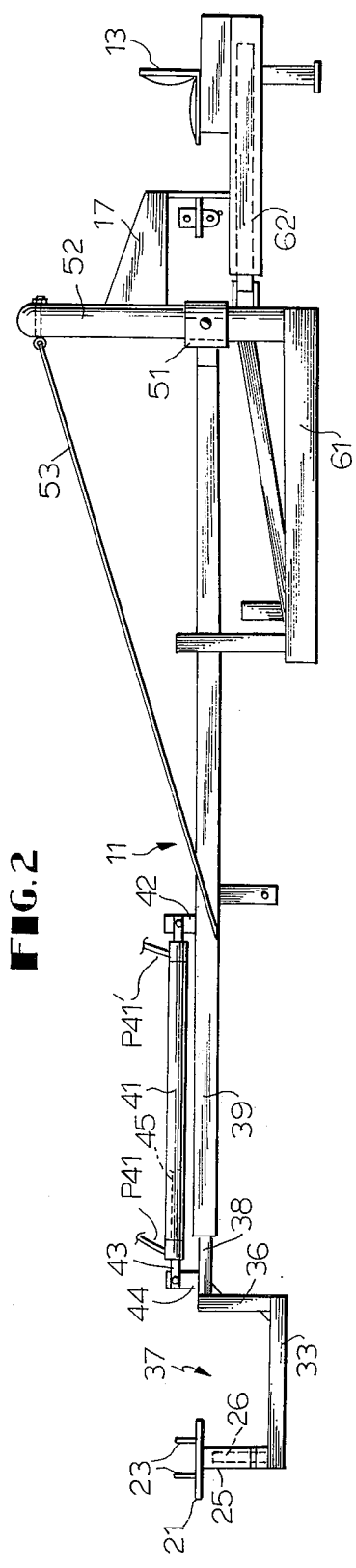

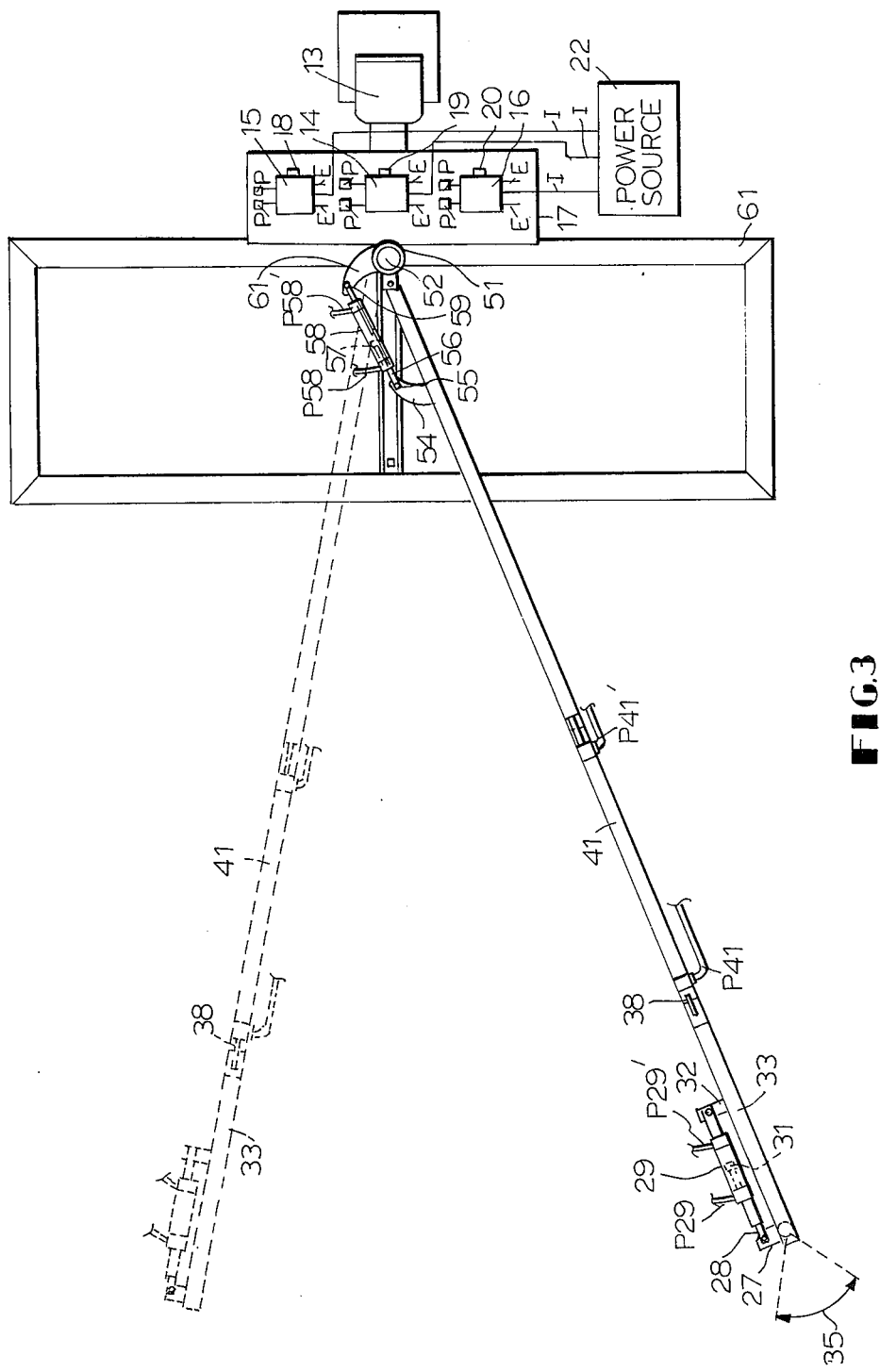

APPARATUS FOR TRAINING CUTTING HORSES

BACKGROUND OF THE INVENTION

Field of the Invention

This invention relates to an apparatus for training cutting horses. More particularly, this invention relates to apparatus for training cutting horses, wherein an artificial calf is utilized.

TECHNICAL CONSIDERATIONS AND PRIOR ART

Cutting horses are utilized to separate calves from a herd of cattle. This is accomplished by confronting the calf to be removed or "cut" head-on with the cutting horse which is controlled by its rider so as to manuever the calf.

The cutting horses themselves must be specially trained to perform this task. This training is difficult because the horses are generally trained by using live calves who, of course, move according to their own wishes instead of according to a program designed to educate the horse. Training of cutting horses is, therefore, often an arduous, difficult and expensive task. In order to make their training easier, the instant invention proposes using an artificial calf which can be selectively manuevered when training a cutting horse.

Since it is important that the cutting horse learns to continually face the calf as the calf is being manuevered, it is important that the caif be mounted so that it may be moved in a fashion to facilitate this training. The prior art, while disclosing artificial calves for training roping horses, does not include structure which would facilitate training cutting horses because the calves for training roping horses move in definite, predetermined paths. For example, U.S. Pat. No. 3,324,832 discloses a roping horse training device in which the calf moves along a straight line, while U.S. Pat. No. 3,802,706 discloses a roping horse trainer in which an artificial steer moves in a circle. In training cutting horses, a more flexible approach is needed.

OBJECTS OF THE INVENTION

In view of the need for a training aid for cutting horses, it is an object of this invention to provide an artificial calf for training cutting horses.

In view of the deficiencies of prior art artificial calves with respect to training cutting horses, it is an object of the instant invention to provide a new and improved artificial calf and apparatus for manipulating the calf to train cutting horses.

It is another object of the instant invention to provide new and improved apparatus for manipulating an artificial calf with great flexibility.

It is still a further object of the instant invention to provide a new and improved apparatus for manipulating an artificial calf, wherein certain manuevers such as swiveling, advancing and retreating, and sweeping in a horizontal plane may be performed either individually or in concert.

SUMMARY OF THE INVENTION

With these and other objects in mind, the instant invention contemplates an apparatus for training cutting horses, wherein an artificial calf is manuevered by means which swivel a calf about a vertical axis passing therethrough, advance and retreat the calf, and sweep the calf in a horizontal plane about a second vertical axis spaced from the vertical axis passing through the calf.

BRIEF DESCRIPTION OF THE DRAWINGS

FIG. 1 is a perspective view of a cutting horse being trained by an artificial calf in accordance with the instant invention.

FIG. 2 is a side view of an apparatus for training cutting horses in accordance with the instant invention.

FIG. 3 is a top view of the apparatus of FIG. 2 showing how the apparatus sweeps the calf in a horizontal plane.

DESCRIPTION OF THE PREFERRED EMBODIMENT

Referring now to FIG. 1, there is shown an artificial calf 10 which may be made from fiberglas, plastic or the like. The calf 10 is mounted on a traversing apparatus, designated generally by the numeral 11. As will be explained hereinafter, the traversing apparatus 11 moves the calf 10 in a horizontal plane so as to train a cutting horse 12 to manipulate the calf.

The calf made of fiberglass or other similar material weighs between 40 and 50 pounds but is the size of a 300 to 400 pound calf so that, as it is manuevered by the cutting horse, it can withstand collisions with the horse and with other real calves that might be in the pen. As pointed out in the Background of the Invention, it is necessary that the cutting horse learns to always face the calf so as to manuever the calf in the desired direction. Consequently, in training the cutting horse, the calf 10 is mounted so as to swivel with respect to the traversing apparatus 11. As the calf 10 is selectively swiveled, the horse 12 is manuevered by its rider to continually face the calf.

In training the cutting horse 12, the calf 10 is manipulated by an operator who sits in a chair 13 disposed at the opposite end of the traversing apparatus 11. The operator manipulates three four-way valves 14, 15 and 16 which are mounted on a control panel 17 positioned in front of the chair 13. Each valve is associated with a particular motion of the calf. In the illustrated embodiment, the valve 15 is activated to cause the calf to swivel relative to the traversing apparatus 11, either in the clockwise or counterclockwise direction. The valve 14 extends or retracts the apparatus 11 in order to move the calf 10 to the left or right. The valve 16 causes the apparatus 11 to sweep selectively in the clockwise or counterclockwise direction. These three manuevers may be performed individually or in combination according to the desires of the operator controlling the panel 17.

It is important that a single manuever such as swiveling or sweeping or reciprocating can be performed isolated from other manuevers so that if the horse 12 being trained needs work on a particular manuever, that manuever may be emphasized by repetition. It is also important that these manuevers be combined when desired to produce complex and perhaps relatively random motion in the calf 10 so that the calf will simulate the motions of a real calf.

The valves 14, 15 and 16 may be operated by conventional push buttons or levers 18, 19 and 20, respectively. In addition, if desired, the buttons or levers 18, 19 and 20 may be associated with a single steering device (not shown) to integrate their operation while, at the same time, allowing their individual operation.

The valves 14, 15 and 16 preferably control pressure from a conventional pneumatic pressure source such as an air compressor 21 which enters each valve through an inlet hose I and exits from each valve through pairs of power hoses P and exhaust outlets E. The power hoses P are connected to the traversing apparatus 11 in order to move the calf 10.

The traversing apparatus 11 associates the calf 10 with the control panel 17 in the following manner. The calf 10 is rigidly secured to a platform 21 by straps 23 embedded or otherwise securely attached to the calf. The platform 21 is, in turn, rigidly secured to a pipe or tube 25 that is received over a rod 26 to form a bearing for rotatably supporting the calf 10. Projecting laterally from the pipe 25 is an arm 27 that is secured to a piston rod 28 which reciprocates within a pneumatic cylinder 29 in accordance with the movements of a piston 31 within the cylinder. One end of cylinder 29 is secured to a tab 32 projecting from a supporting arm 33 of the traversing apparatus 11. The rod 26 projects vertically from the end of the projecting arm 33 so that the cylinder 29, piston rod 28 and arm 27 form a crank to rotate the pipe 25 through an arc 35 to thereby swivel the calf 10 through the arc 35. The cylinder 29 is, of course, pivotally attached to the tab 32 while the piston rod 28 is pivotally attached to the arm 27.

Power hoses P29 and P29' connect the cylinder 29 to the four-way valve 15. Upon pressurizing power hose P29 and exhausting power hose P29', the piston 31 slides to the right, causing the arm 27 and tube 25 to rotate in the clockwise direction, thereby swiveling the calf 10 in the clockwise direction. Upon pressurizing the power hose P29' and exhausting the power hose P29, the piston 31 slides to the left, thereby causing the calf 10 to swivel in the counterclockwise direction. The swiveling motion of the calf 10 is always relative to the arm 33 of the traversing apparatus 11 in response to operation of the valve 15. The power hoses P29 and P29' are of sufficient flexibility to accommodate other motions of the traversing apparatus 11.

The arm 33 has at its inboard end a vertical portion 36 which is attached to the rest of the traversing apparatus 11 and cooperates with the rod 26 and pipe 25 to form an opening, generally designated by the numeral 37, which accommodates the rear legs of the calf 10 as the calf is swiveled. The traversing apparatus 11, consequently, does not interfere with the calf 10 as the calf is swiveled.

The vertical portion 36 of arm 33 is joined to a horizontal length 38 that is, in turn, telescopically received within a tubular boom 39. The length 38 is selectively slid in and out of the boom 39 by a second hydraulic cylinder 41 to reciprocate the calf 10 toward and away from the operator. The hydraulic cylinder 41 has one end attached to a flange 42 on the boom 39 and has a piston rod 43 which is attached to a flange 44 on the length 38. The piston rod 43 is secured to a piston 45 within the cylinder 41 that is driven by power lines P41 and P41' which are registered with valve 14. Upon applying pressure to the line P41 and exhausting the line P41', the piston 45 moves to the right and retracts the calf 10 toward the operator. Upon applying pressure to the power line P41' and exhausting the power line P41, the calf 10 moves to the left and away from the operator. As stated before, this reciprocal motion of the calf 10 or linear motion relative to the traversing apparatus 11 may be performed either in isolation or in conjunction with swiveling the calf 10 through the arc 35. The line P41 is flexible in order to accommodate changes in the length of the traversing apparatus 11.

The boom 39 extends back to a position just in front of the control panel 17 and is pivoted about a vertical pivot to a supporting collar 51 so as to be able to sweep rotatably in the clockwise and counterclockwise directions in a horizontal plane, as seen in FIG. 2. The collar 51 is rigidly secured to a vertical post 52 from which a cable 53 extends to help support the boom 39. In order to activate the boom 39 to sweep, an arm 54 is rigidly attached thereto which has a pivot point 55 at the end thereof. To the pivot point 55, a piston rod 56 is pivotally attached and extends to a piston 57 within a third cylinder 58. The third cylinder 58 is, in turn, pivoted in pivot point 59 to an arm 61 which is rigidly secured to the collar 51. As the piston rod 56 is extended from and retracted into cylinder 58, the boom 39 pivots about the collar 51 and sweeps in the horizontal plane.

Power lines P58 and P58' project from the cylinder 58 and register with the four-way valve 16. When the power line P58 is energized and the power line P58' is exhausted, the piston 57 is forced back into the cylinder 58 which causes the boom 39 to sweep in a clockwise direction. When the power line P58' is energized and the line P58 is exhausted, the piston 57 slides out of the cylinder 58 and causes the boom 39 to rotate or sweep in the counterclockwise direction. In this way, the calf 10 is swept back and forth in a horizontal plane. This sweeping motion may be performed individually or in combination with the swiveling and reciprocating motion of the calf 10 according to the desires of the operator in order to train the horse 12.

The post 52 is connected to a frame 61 which also supports the chair 13 and control panel 17 on a strut arrangement 62 which projects from the frame 61. If necessary, the frame 61 may be secured by driven post or other arrangements to the ground so that it will not shift as the calf 10 is being manipulated. Generally, the cutting horse is trained in a corral having a radius of 25 to 30 feet, while the traversing apparatus has a maximum extent of 18 feet and a minimum extent of 14 feet. The calf 10 is able to swivel through an arc of 90° on the rod 26, while the boom 39 sweeps through an arc of 45 degrees.

The afore-described embodiment is to be considered as being merely illustrative of the invention, such invention being defined and limited only by the following claims.

I claim:

1. An apparatus for training cutting horses, comprising:
    a base for supporting said apparatus;
    an artificial calf;
    means for mounting said calf, wherein said mounting means is rotatable about a vertical axis to swivel said calf;
    extension means for supporting said mounting means;
    boom means for supporting said extension means, said boom means including means for projecting and retracting said extension means to increase and decrease the distance of said calf from said base;
    a pivot for mounting said boom means on a base to allow said boom means to sweep in a horizontal plane;
    first drive means connected between said mounting means and extension means for rotating said mounting means relative to said extension means;

second drive means connected between said extension means and boom means to reciprocate said extension means relative to said boom means;

third drive means connected between said base and said boom means to sweep said boom means relative to said base; and control means for selectively energizing said first, second and third drive means individually and in concert.

2. The apparatus of claim 1, wherein the extension means telescopes relative to boom means to increase and decrease the distance of said calf from said base.

3. The apparatus of claim 1, wherein the drive means is pneumatically energized.

4. The apparatus of claim 1, wherein the extension means includes a U-shaped portion, the opening of which accommodates the rear legs of the calf as the calf swivels.

5. An apparatus for training cutting horses, comprising:

a base;

an artificial calf;

means for swiveling the calf selectively about a first vertical axis passing through the calf;

means for retracting and projecting the calf selectively relative to said base; and means for sweeping the calf in a horizontal plane about a second vertical axis spaced from said first vertical axis.

6. The apparatus of claim 5, wherein said second vertical axis extends from said base.

7. The apparatus of claim 5, further including an operating station attached to said base for controlling the motion of said calf.

8. The apparatus of claim 7, wherein the second vertical axis is between the calf and the operating station.

* * * * *